(Model.)
W. M. FULLER.
PULVERIZING MACHINERY FOR ORES, &c.
No. 278,232. Patented May 22, 1883.
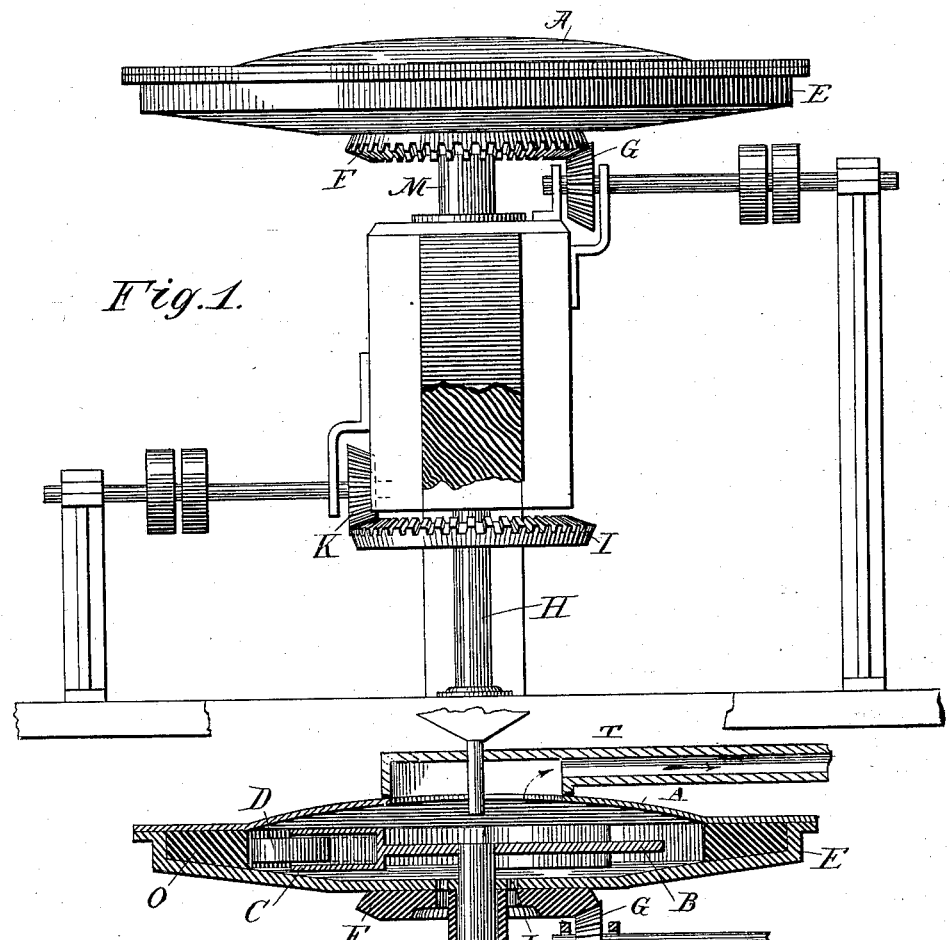
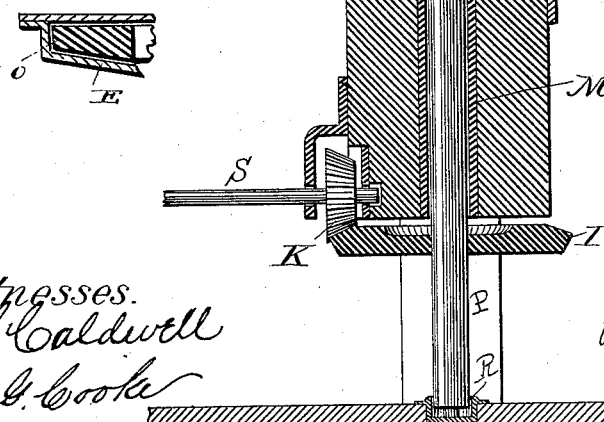
Witnesses.
E. S. Caldwell
A. G. Cooke
Inventor.
Willard M. Fuller
By his Attorney
C. M. Alexander.

UNITED STATES PATENT OFFICE.

WILLARD M. FULLER, OF NEW YORK, ASSIGNOR OF ONE-HALF TO F. S. BURR AND J. B. RICHMOND, OF BROOKLYN, N. Y.

PULVERIZING MACHINERY FOR ORES, &c.

SPECIFICATION forming part of Letters Patent No. 278,232, dated May 22, 1883.

Application filed July 17, 1882. (Model.)

*To all whom it may concern:*

Be it known that I, WILLARD M. FULLER, of New York, in the county of New York and State of New York, have invented certain new and useful Improvements in Pulverizing Machinery for Ores and other Material; and I do hereby declare that the following is a full, clear, and exact description thereof, reference being had to the accompanying drawings, and to the letters of reference marked thereon, which form a part of this specification.

This invention relates to certain improvements in apparatus for pulverizing ores and other substances; and it has for its object to provide a machine in which the material will be carried from the center to the periphery of a suitable casing and pulverized by the action of rollers pocketed in a revolving disk against an annulus secured in the said casing, the annulus being detachable, so that it may be removed and replaced when worn, as more fully hereinafter specified. These objects I accomplish by the means illustrated in the accompanying drawings, in which—

Figure 1 represents a view, partly in elevation and partly in section, of my improved machine; Fig. 2, a vertical sectional view thereof; and Fig. 3, a vertical sectional view of a portion or part of the casing or pan and the annulus, the latter being indicated as removable from the former.

The letter E indicates a pan or casing, constructed of suitable material, mounted upon a hollow shaft, M, which is journaled vertically in the frame of the machine, as indicated in Fig. 2 of the drawings. To the said tubular shaft at its upper end, or to the bottom of the pan, is secured a beveled-gear wheel, F, which intergears with a beveled pinion, G, mounted upon a horizontal shaft, N, journaled in suitable bearings secured to the frame of the machine, by means of which a rotary motion may be imparted to the pan. The said pan is provided with a removable metallic annulus, O, against which the ores are crushed or pulverized, as more fully hereinafter specified, and with a cover, A, having an opening at the center through which the ores are fed. Within the pan is located a rotating disk, B, having a series of pockets, C, at its periphery, in which set loosely the rollers D. The said disk is mounted upon a vertical shaft, P, which is stepped in a bearing, R, in the frame, and extends through the tubular shaft M, before mentioned. The said shaft P is provided with a beveled-gear wheel, I, which intermeshes with a beveled pinion, K, mounted on a shaft, S, journaled in suitable bearings on the frame of the machine, by means of which a rotary motion may be imparted to said disk. The shafts N and S are provided with fast and loose pulleys, by means of which they may be rotated or thrown out of operation, in connection with suitable bands.

The operation of my invention is as follows: The pan and disk are driven in opposite directions by means of their gearing, and the material to be pulverized is fed in through the opening in the center of the cover, and is carried to the periphery thereof by centrifugal force and thrown against the annulus, against which it is pulverized by the action of the rollers. The disk revolving creates a partial vacuum in the lower portion of the pan, which is relieved by the air, which, entering the apertures L in the bottom of the pan and passing to the upper side of the disk, passes through the pulverized material and carries it out of the pan through the central opening. The pulverized ore is carried off through a suitable conduit, T, one end or portion of which connects with an exhaust-fan, by means of which the withdrawal of the pulverized ore may be effected.

Having thus fully described my invention, what I claim, and desire to secure by Letters Patent, is—

The combination, in a pulverizing-machine, of the rotary pan and reversely-rotating disk and their operating-gearing, the rollers loosely located in pockets in said disk, and the detachable annulus against which the ores are crushed, the said pan having openings at the top and bottom, and a conduit for carrying off the pulverized ore, substantially as specified.

In testimony that I claim the foregoing as my own invention I affix my signature in the presence of two witnesses.

WILLARD M. FULLER.

Witnesses:
A. M. WHITBECK,
JOHN H. KATTENSTROTH.